United States Patent
Zeyger

(10) Patent No.: US 8,051,918 B2
(45) Date of Patent: Nov. 8, 2011

(54) METHOD AND APPARATUS FOR WEED REMOVAL

(76) Inventor: Eugene Zeyger, Medfield, MA (US)

( * ) Notice: Subject to any disclaimer, the term of this patent is extended or adjusted under 35 U.S.C. 154(b) by 0 days.

(21) Appl. No.: 11/703,658

(22) Filed: Feb. 8, 2007

(65) Prior Publication Data

US 2008/0190629 A1 Aug. 14, 2008

(51) Int. Cl.
*A01B 1/00* (2006.01)
(52) U.S. Cl. .......................... 172/37; 172/371
(58) Field of Classification Search ............ 172/29, 172/142, 347, 371, 381, 497, 500, 515, 506, 172/514, 570, 705, 707, 37; 269/3, 6, 254
See application file for complete search history.

(56) References Cited

U.S. PATENT DOCUMENTS

| | | | | |
|---|---|---|---|---|
| 1,407,232 A * | 2/1922 | Stevens | .......................... | 294/50.5 |
| 1,743,590 A * | 1/1930 | Binz | ............................. | 606/133 |
| 2,064,448 A * | 12/1936 | Rieff | ............................. | 294/50.9 |
| 2,747,490 A * | 5/1956 | Brown | ........................... | 172/532 |
| 3,082,829 A * | 3/1963 | Buddingh et al. | ............. | 172/184 |
| 3,268,255 A * | 8/1966 | Bennett | ........................ | 294/50.9 |
| 4,251,914 A * | 2/1981 | Grosjean | ............................ | 30/32 |
| 5,084,056 A * | 1/1992 | Eckel et al. | .................... | 606/133 |
| 5,370,191 A * | 12/1994 | Lee | ................ | 172/378 |
| 5,743,340 A * | 4/1998 | Giacomini | .................... | 172/371 |
| 5,899,900 A * | 5/1999 | Burke | ............................. | 606/43 |
| 6,159,222 A * | 12/2000 | Yiu | ............................. | 606/133 |
| 6,691,793 B2 * | 2/2004 | Ota | ............................... | 172/371 |
| 2002/0190451 A1* | 12/2002 | Sancaktar et al. | ............ | 267/166 |
| 2004/0007369 A1* | 1/2004 | Ota | ................ | 172/100 |
| 2004/0040093 A1* | 3/2004 | Lee | ................ | 7/114 |
| 2004/0245003 A1* | 12/2004 | Ota | ................ | 172/378 |
| 2006/0229667 A1* | 10/2006 | Hoppenot | ..................... | 606/210 |

FOREIGN PATENT DOCUMENTS

SU 1373339 A * 2/1988
* cited by examiner

*Primary Examiner* — Robert Pezzuto
*Assistant Examiner* — Matthew Troutman

(57) ABSTRACT

A method and apparatus for weed removal, wherein using a depilatory method (new use) with an extension spring having an arcuate axis and being driven in a rotational sliding motion relative to the soil-bearing weed to be removed. For this purpose the apparatus is equipped with a spring (10), having an arcuate axis that is bent at 180 degrees and the spring is made in the shape of a spring of variable rate, so that the spring has a large diameter in its middle zone and conically reduced cylindrical ends of smaller diameter.

7 Claims, 3 Drawing Sheets

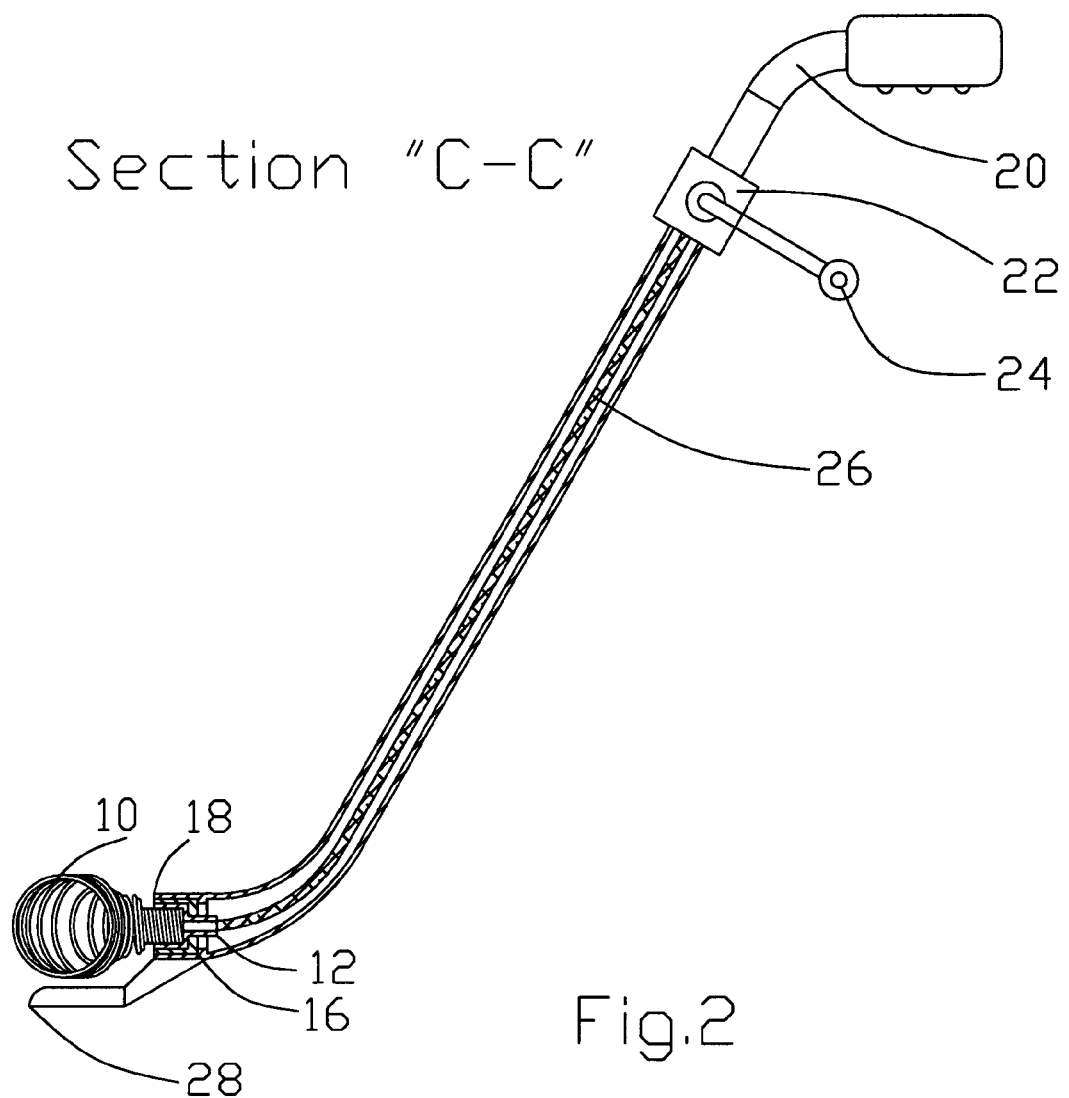

METHOD AND APPARATUS FOR WEED REMOVAL

CROSS-REFERENCE TO RELATED APPLICATIONS

This application claims the benefit of disclosure document U.S. Pat. No. 593,078, filed Jan. 17, 2006 by the present inventor.

FEDERALY SPONSORED RESEARCH

Not Applicable

BACKGRROUND OF THE INVENTION

1. Field of Invention

This invention relates to the method and apparatus for removing weeds (together with their roots) out of soil, mainly for servicing a flower and vegetable beds by the homeowner.

2. Prior Art

There is a known mechanical method and apparatus for plucking "sticking" elements out of a soft base. Such is an apparatus for hair removal, according to U.S. Pat. Nos. 4,524,772; 4,923,460. The hairs are removed from the skin by a helical extension spring at an arcuate axis that is bent and arranged to be driven in a rotational sliding motion.

It is possible by means of this method to remove weeds out of soil as well. But this depilatory device can not be used for weed removal directly because the size and design of the spring (outside diameter and wire diameter) can not pluck a "stick" thicker than hair. Even if increased by scale to the needed size the said spring would be too large and would not be able to remove weeds selectively—without damaging useful plants.

SUMMARY

In accordance with the present invention, the said method for hair removal can be used for weed removal (new use). For this purpose the apparatus for weed removal is equipped with a spring of special design. A cylindrical, helical extension spring of large diameter at both ends is conically reduced to cylindrical ends of smaller diameter. The helical spring has an arcuate axis that is bent at 180 degrees, so both ends of small diameter are attached to driven mechanism.

DRAWINGS—FIGURES

FIG. 2 shows a plane Section "C-C" of the perspective view of the apparatus.

DRAWINGS—REFERENCE NUMERALS

Figure 1:
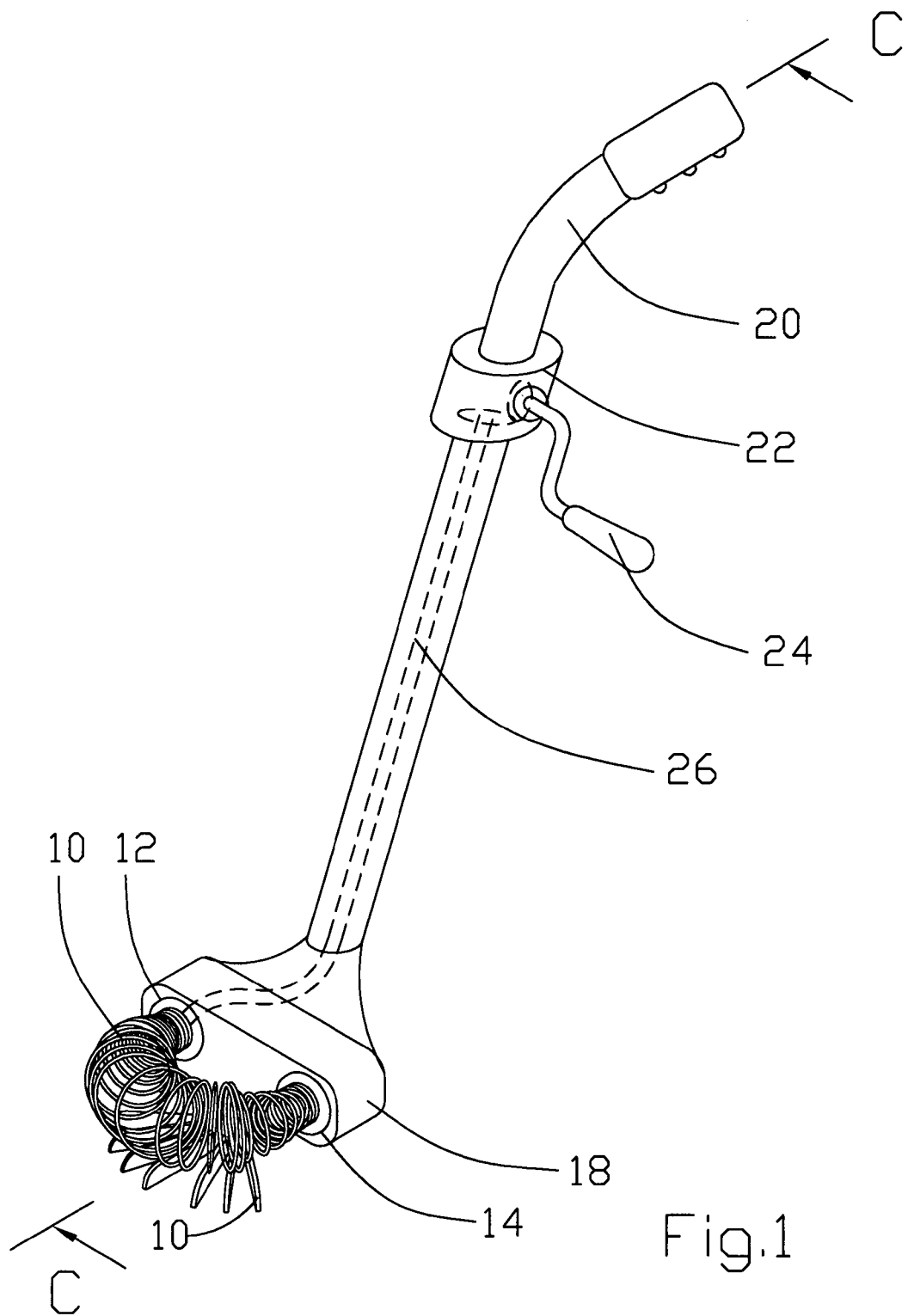
FIG. 1 shows a general 3-D (perspective) view of the apparatus for weeds removal.
Figure 3A:
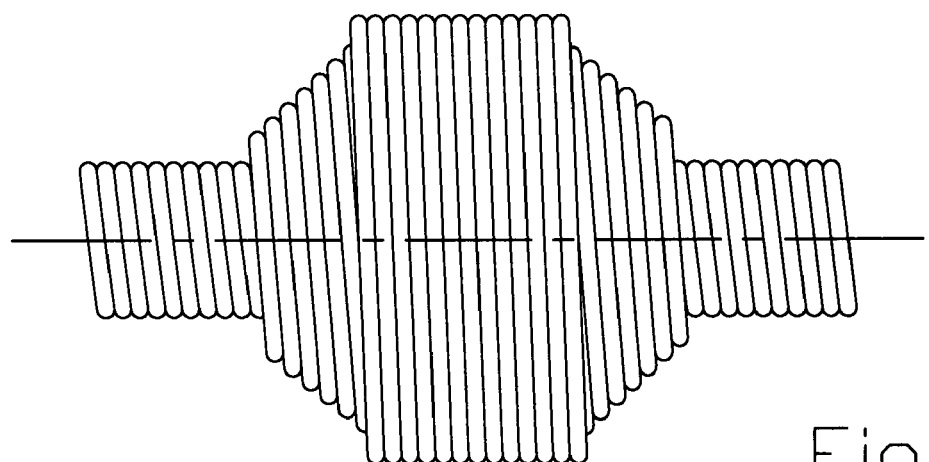
FIGS. 3A and 3B show the spring at straight (free) and bent positions.
Figure 3B:
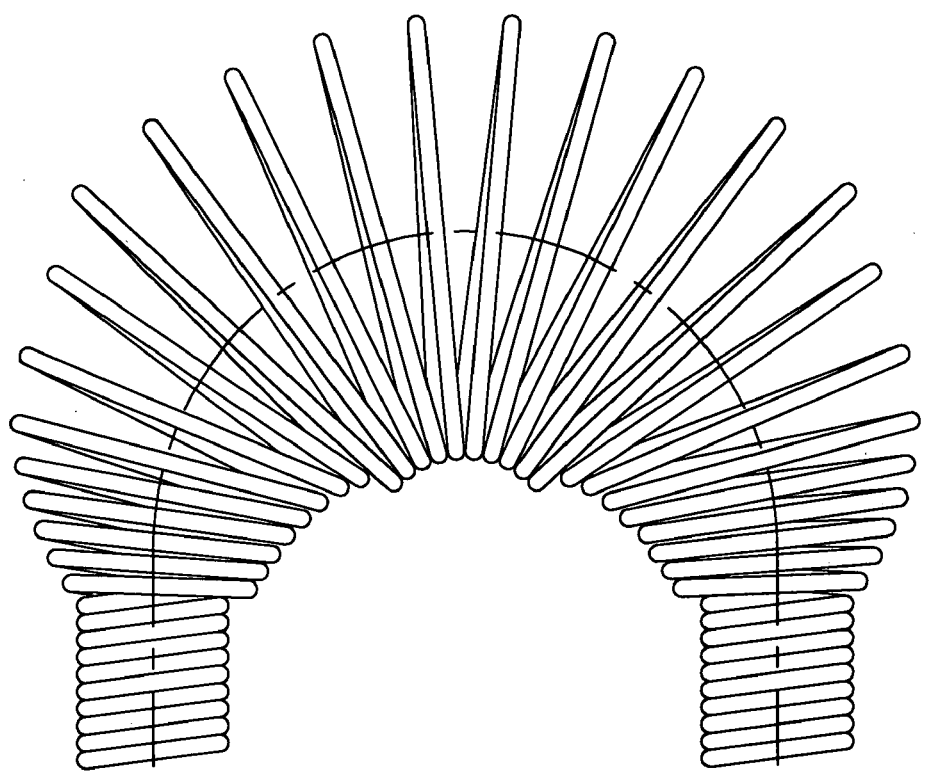

| 10 | Spring |
| 12 | Driven spindle |
| 14 | Driving spindle |
| 16 | Bearing |
| 18 | Drive housing |
| 20 | Hand held stick |
| 22 | Right angle gear box |
| 24 | Driving handle |
| 26 | Flexible shaft |
| 28 | Comb |

DETAILED DESCRIPTION—FIG. 1 to 3B

The spring 10 (FIG. 1) has an arcuate axis that is bent at 180 degrees, so that on the convex side the windings are spread apart and on the concave side the windings are pressed together. One end of the spring 10 is fixedly attached to a driven spindle 12, while the other end is fixedly attached to a driving spindle 14. Both spindles 12 and 14, are installed in bearings 16 (FIG. 2) mounted in a drive housing 18. The housing 18 is fixed to a hollow hand held stick 20, equipped by a right angle gear box 22, with a driving handle 24. A flexible shaft 26 joins the gear box 22 with the driving spindle 14. In order to protect the spring 10 against incidental things (mulch, a rock, etc.) a comb 28 is attached to the bottom of the housing 18, under the spring 10.

The spring 10 (FIG. 3A) is made in the shape of cylindrical helical extension spring of large diameter in its middle zone. Both ends of the spring are conically reduced to cylindrical ends of smaller diameter.

The spring 10 (FIG. 3B) has an arcuate axis that is bent at 180 degrees. Both ends of the spring are attached to the spindles 12 and 14 correspondingly. So the spring comprises a plurality of adjacent windings arranged to be driven in a rotational sliding motion relative to the soil-bearing weeds to be removed.

Operation-FIGS. 1, 2

Taking the apparatus in one hand by the hand held stick 20 the user puts it on the soil by the comb 28 and moves the convex side of the spring 10 in the direction of weed until a stem enters the spread apart windings. At the same time the user rotates the driving handle 24 with the another hand and the flexible shaft 26 rotates the driven spindle 12 into bearing 16, moving the spring, 10 over the surface of the soil. The compressed coils of the spring will pluck out the weed which becomes trapped between the loops of the spring, providing a pulling action and removing the weed with its roots. The second end of the spring 10 which is attached to the driving spindle 14 will be free to rotate. During each revolution of the spring 10 each pair of adjoining windings performs a cycle from spread apart to pressed together positions, ripping out the weeds and throwing them to the ground.

A spring of conical shape has a variable rate under load along an axis. The spring 10 has been bent at 180 degrees, so that during a pulling action while removing the weeds (by middle zone of arc) the spring will not be extended in side zones of the arc and will keep the arc in its necessary shape.

In practical design the spring 10 should be made about: 2.5" (65.0 mm) diameter of middle part, 1.0" (25.0 mm) diameter of both ends and 0.1" (2.5 mm) diameter of wire. Number of coils about: middle part—10, conical parts—5 each and ends—10 each. At this size the bent spring will have a clearance between coils on the convex side of about 0.5" (12.0 mm),—for passing of weed stem.

There are possible variations of the spring drive:
The flexible shaft can be connected to a gear transmission installed between the spindles, in order to drive both spindles in opposite directions.
The spring can be equipped with a motor in order to drive the spring mechanically.

The driving handle can be equipped with a ratchet trigger and push-pull rod connected to the spindles, in order to rotate the spring one revolution for every trigger stroke.

Other well-known driving systems are not written here because they are not the object of the present invention.

I claim:

1. An apparatus for weed removal comprising:

an elongated, substantially hollow hand-held stick extending between a proximal and distal end thereof, a drive housing positioned at the distal end of the elongated stick, said drive housing formed with first and second spaced from each other driving spindles, a driving handle provided at the proximal end of the elongated stick, said first spindle and the driving handle are movably connected by a flexible shaft passing within said hollow hand-held stick, and a helical spring having a substantially cylindrical middle zone interposed between first and second conically shaped end portions, approximately 180° bend being formed in the middle zone of the spring defining an external convex side and an internal concave side thereof, so that windings of the spring on the convex side are spread apart and the windings on said concave side are pressed together, said first end of the spring is movably connected to the first spindle and said second end portion of the spring is connected to the second spindle, rotational motion of the driving handle is transferred to the first spindle and to the spring by means of the flexible shaft, whereby in operation of the apparatus weed stems enter and engage the spread apart windings at the external convex side of the spring and are removed upon rotation of the spring within said first and second driving spindles.

2. The apparatus of claim 1, wherein said spring has a variable diameter along a longitudinal axis thereof.

3. The apparatus of claim 1, wherein said second spindle is an idle spindle provided to movably support the second end portion of the spring and to retain the bent shape of the middle zone of the spring during operation of the apparatus.

4. The apparatus of claim 1, wherein a diameter of said substantially cylindrical middle zone of the spring is greater than an outer periphery of each said conical end portion adjacent to the respective driving spindles.

5. The apparatus of claim 1, wherein substantially equal angles are formed between the windings in the middle zone of the spring.

6. The apparatus of claim 4, wherein said conical end portions of the spring have variable angles between the windings ranging from equivalent to an angle of windings of the larger diameter of the middle zone and zero degrees at the conically shaped end portions connected to the respective spindles.

7. The apparatus according to claim 6, wherein the variable angles are determined by increasing spring rate under load of the conical end portions, so as to prevent the spring from extending the conically shaped end portions during the weed removal action, to increase grip of weed stems by the spring during the weed removal action, while keeping ends of the substantially cylindrical middle zone of the spring in a substantially parallel to each other position.

* * * * *